March 21, 1967 — G. FRANZEN — 3,309,858

THREAD BRAKE, ESPECIALLY FOR DOUBLE TWIST SPINDLES

Filed July 31, 1964 — 3 Sheets-Sheet 3

United States Patent Office 3,309,858
Patented Mar. 21, 1967

3,309,858
THREAD BRAKE, ESPECIALLY FOR DOUBLE TWIST SPINDLES
Gustav Franzen, Neersen, near Krefeld, Germany, assignor to Palitex Project-Company G.m.b.H., Krefeld, Germany
Filed July 31, 1964, Ser. No. 386,627
Claims priority, application Germany, Aug. 9, 1963, N 23,587
10 Claims. (Cl. 57—58.86)

The present invention relates to a thread brake, especially for double-twist spindles. Various designs of thread brakes within the range of the hollow shank of double-twist spindles have been known. Among others, there have been known thread brakes in which the thread is adapted to be passed through between two braking bodies of which at least one is held in its respective position in the housing of the braking body by means of a magnet. For instance, with this known design there is provided a steel ball which acts as braking body and is freely movable in a housing of the braking body through which the thread is axially passsed. The lower thread discharge aperture is formed by a thread discharge funnel on which the braking ball rests to that the thread has to move between the said funnel and a ball surface and is braked therebetween. In order that the braking effect not be determined by the weight of the steel ball alone, which might not furnish sufficient braking force, the housing of the braking body is somewhat below the said funnel surrounded by an annular magnet which aids the weight of the steel ball and pulls the latter against the funnel for the thread passage.

With heretofore known thread brakes, difficulties occur when the thread is to be threaded through the hollow shank of the spindle and through the housing of the braking body because, during such threading operation, the braking body, such as the braking ball, is in the way of the thread.

It is, therefore, an object of the present invention to provide a thread brake especially for double-twist spindles which will overcome the above-mentioned drawbacks.

It is another object of this invention to provide a thread brake, especially for double-twist spindles, which, while employing a ball as braking body, will make it possible to move the ball out of its way when a threading operation is intended, i.e. when the thread is to be threaded through the spindle shank and the thread brake as, for instance, after a thread break.

It is still another object of this invention to provide a thread brake as set forth in the preceding paragraphs which is simple in construction and operation.

These and other objects and advantages of the invention will appear more clearly from the following specification in connection with the accompanying drawings, in which:

FIGURE 1 diagrammatically illustrates partly in section a vertical section through a spindle shank with bobbin-holder and cop thereon and with a thread brake according to the present invention;

Figure 1:
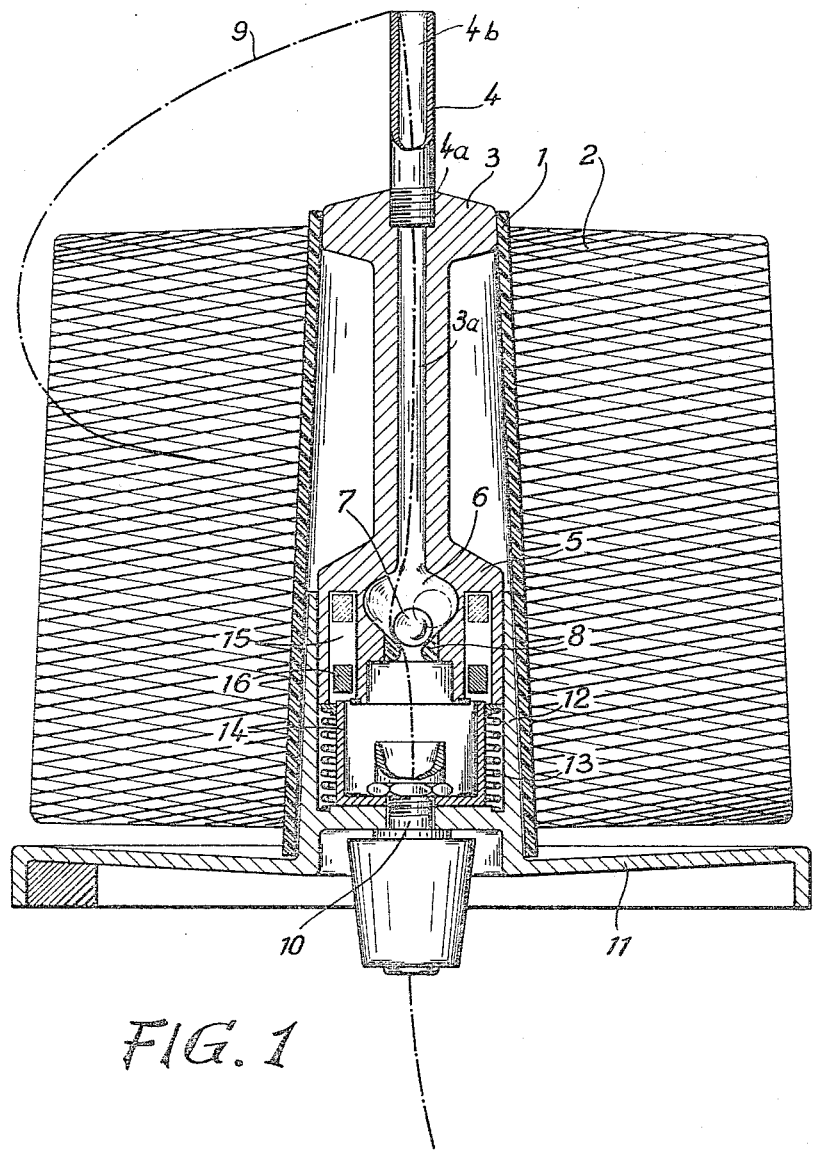

The thread brake according to the present invention in which the thread is adapted to be pulled through between two braking bodies of which at least one is held in its respective position in the braking body housing by a magnet is characterized in that the magnet is in the direction of the thread movement displaceably arranged and guided on the brake body housing in such a way that the magnet is operable selectively to press a movable brake body against a fixedly arranged brake body or to lift said movable brake body off said fixedly arranged brake body. This general idea may be realized by various structures. When a thread brake is involved in which one brake body is represented by a steel ball freely movably located in a widened portion of the housing for the brake body, and when the stationary brake body is formed by a thread passage funnel forming the lower end of said broadened housing, at the level of which an annular magnet surrounds the brake body housing and pulls the ball into the thread passage funnel, the annular magnet may, in conformity with the present invention, be held and guided in the brake body housing so as to be displaceable in upward direction. In this connection, it is advantageous, in conformity with the present invention, to make the inner diameter of the broadened portion of the brake body housing about twice the diameter of the movable braking ball, so that the ball, when pulled upwardly by the annular magnet, will be located so far outwardly in said broadened portion that the ball will no longer be in the way of the thread being threaded through the brake.

According to a further development of the present invention, the brake body housing may rest on a spring and may be axially displaceable against the thrust of said spring. Below said holding magnet there may be provided a sleeve resting on the support for the spring which sleeve will move the holding magnet upwardly relative to the braking body housing when the latter is pressed downwardly. This brings about that a mere axial downward movement of the brake body housing will suffice to lift the movable steel ball off its seat in the thread passage funnel so that the thread can be freely threaded and passed through the thread brake. During this operation the ball automatically moves outwardly into a broadened section and is held in said broadened section by the said magnet. When the brake body housing which may form a part of the spindle shank, is released, the spring again pushes the brake body housing upwardly. As a result thereof, the supporting edge of the supporting sleeve moves away from the magnet, and the latter is able to return downwardly to its previous position in which it pulls the steel ball against the thread passage funnel so that the thread again passes between the inner surface of the thread passage funnel and the surface of the ball.

According to still another embodiment of the invention, the brake body housing may have a unilaterally extending ball pocket with a steel ball freely movable therein while on the opposite side there is provided a trough-shaped brake body behind which there is located a magnet displaceable in the direction of movement of the thread through the brake housing. The magnet pulls the steel ball into the trough-shaped brake body, and the thread must pass between the ball surface and the inner surface of the trough while being braked. When the magnet is displaced from its position behind the trough-shaped brake body, the magnetic field will be so weakened or interrupted that the ball will no longer be held in the trough-shaped brake body. The ball will therefore detach itself from the brake body, and the thread may now pass through the brake body housing without being braked.

Instead of employing a ball as freely movable brake body and to move said ball by a magnet from the outside, it is to be noted that according to the present invention, also differently shaped brake bodies may be employed in a corresponding manner. In this connection, it may be provided, according to the present invention, that one brake body is formed by a non-magnetic brake disc which faces a brake disc of magnetic material mounted on a pin perpendicular with regard to the direction of the thread movement through the brake. The brake disc of magnetic material is pressed against the non-magnetic brake disc by the repelling force of a magnet displaceable in the direction of movement of the thread and located behind the said brake disc of non-magnetic material. This brake disc may also be designed as a steel disc equipped with a braking material as, for instance sinter corundum, porcelain, or the like. In this position the braking of the thread passing through the housing will be effected. When, however, the magnet is displaced, the repelling force of the magnet is eliminated, and so is the pressure at which the brake disc of magnetic substance is pressed against the other brake disc. The thread can then be pulled in unbraked condition between the discs.

For purposes of controlling the magnetic force, the brake disc may be adjustable in a magnet holder in the direction of the pin.

According to a further development of the invention, it is also possible to employ the magnet exclusively for detaching one brake body. Starting from a thread brake in which a steel ball is pressed against the thread passage funnel by the thread-guiding member displaceable in the brake body housing, and through the intervention of a spring, a magnet, a wedge or the like, it is provided in accordance with the present invention that the brake body housing is broadened above the thread passage funnel, and in the central plane of the broadened portion, carries a magnet. If, in such an instance the thread-guiding member is axially moved away from the brake ball against the thrust of a pressure spring or the like, the steel ball will simultaneously by the force of the magnet be lifted off from the thread passage funnel and will eventually laterally be pulled into the broadened portion. Also in this way, it is brought about that the magnetic force detaches the two braked bodies from each other and with the thread can pass through the housing in an unbraked condition. When the lifted thread guide tube is released, the force of its spring or the magnetic force or weights will automatically return the thread guide tube to its starting position, viz. to the braking position. The thread guide tube will then eventually rest from above upon the ball. In this instance, the bottom portion of the ball rests on an annular seat and is engaged from above annularly by the thread guiding member so that the thread will be braked at two clamping sections.

Referring now to the drawing in detail, the arrangement shown in FIG. 1 illustrates a spindle shank or bobbin-holder or mandrel 3 supporting a bobbin sleeve 1 with a yarn body or cop 2 thereon. Threaded into the upper portion of shank 3 at 4a is a thread guiding tube 4 the bore 4b of which is in axial alignment and communicates with a bore 3a in hollow shank 3. The lower end of shank 3 is broadened in a bell-shaped manner so as to form a brake body housing 5. Within a chamber 6, considerably broadened with regard to the diameter of bore 3a and located in the housing 5, there is freely movably mounted a first brake body comprising ball 7 which when occupying its full-line position rests upon a second brake body 8. This second brake body may form a thread passage funnel. The thread passing through the brake housing 5 is designated with the reference numeral 9. The thread is wound off from cop 2, then passes through thread guiding tube 4, through shank 3, the broadened chamber 6 and through the thread passage funnel formed by brake body 8. The thread then continues further downwardly through a central bore 10 in a bobbin plate 11. The brake body housing 5 is axially displaceably guided in a centering sleeve 12 of the bobbin plate 11. As will be seen from the drawing, bobbin housing 5 rests by means of its lower edge upon a helical pressure spring 13. Within pressure spring 13 there is provided a cup-shaped member 14. Above the upper edge of said cup-shaped member 14 and provided in the brake body housing 5 there is an annular chamber 15 in which an annular magnet 16 is axially displaceably located. This magnet 16 normally, i.e. when the brake occupies the full-line position shown in FIG. 1, pulls ball 7 downwardly against the tapering surface of funnel 8 so that the thread 9 is braked between the ball surface of ball 7 and the tapered surface of funnel 8.

If shank 3 is now pressed downwardly, the upper edge of cup-shaped member 14 will engage the lower end surface of magnet 16 and will move the latter relative to housing 5 into the upper position of magnet 16 which is indicated by dot-dash lines, i.e. against the bottom area of the annular chamber or groove 15. This relative displacement of magnet 16 causes the latter to lift ball 7 off funnel 8 and to move said ball into the dot-dash line position of FIG. 1, and ball 7 will be held against the wall of the widened chamber 6 at the level of the magnet 16 in its dot-dash line position. As will be evident from the drawing, in this position of ball 7 the passage from bore 3a through funnel 8 is entirely free so that thread 9 can be threaded or passed through shank 3 in an unimpeded manner. After the threading operation has been completed, the shank 3 is released so that spring 13 lifts the same upwardly into the position shown in FIG. 1 while magnet 16 will again occupy its full-line position with regard to the housing 5 thereby pulling ball 7 back into its full-line position shown in FIG. 1. Thus, the braking position for thread 9 is restored.

Figure 2:
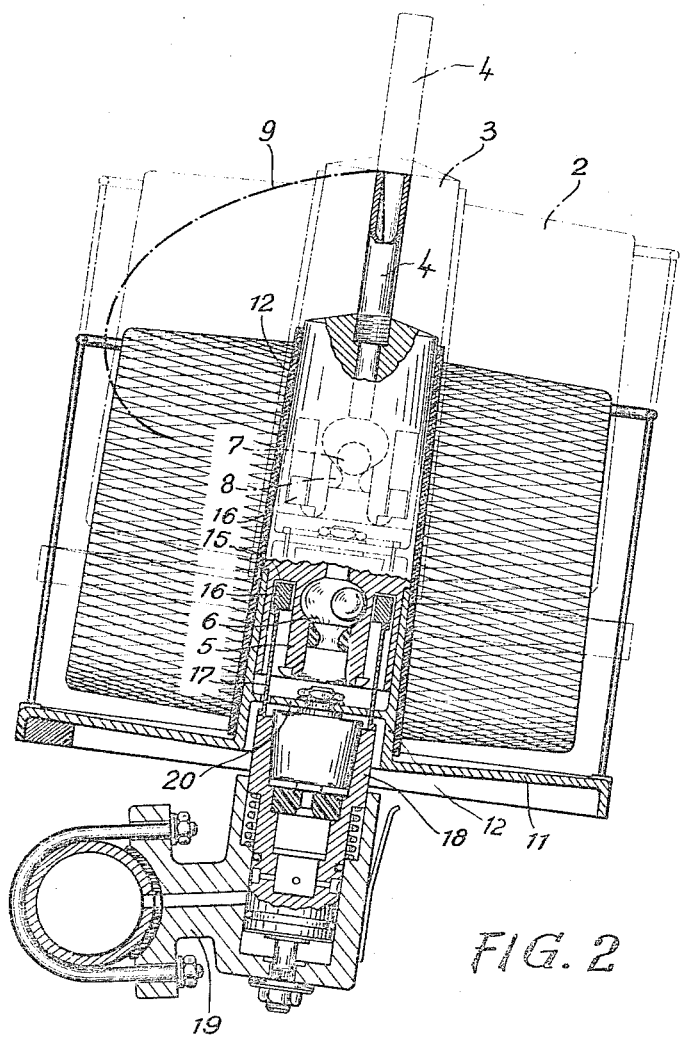
FIGURE 2 illustrates a thread brake according to the invention in combination with a yarn body preparing device, said thread brake being shown in two different positions in full-lines and in dot-dash lines, respectively.

Referring now to FIG. 2, the embodiment of a thread brake shown therein is somewhat similar to that of FIG. 1. Therefore, similar parts have been designated with the same reference numerals as in FIG. 1. The arrangement of FIG. 2 shows the hollow shank 3 with cop 2 in two positions while the arrangement is being placed on an auxiliary device serving for preparing the yarn feed. The starting position is indicated by dot-dash lines.

Prior to mounting the hollow shank 3 with a yarn body onto the auxiliary device generally designated 19, ball 7 rests upon the thread passage funnel and in this position is held by the annular magnet 16. When shank 3 with yarn body 2 is displaced further downwardly, magnet 16 will be displaced relatively upwardly by means of steel pin 17 outside housing 5 and will eventually rest in the bottom area of annular groove 15. Steel pins 17 are connected to the upper edge 18 of the auxiliary device 19 and extend through the bottom 20 of the centering sleeve 12 of the bobbin plate 11. When centering body 3 has reached its deepest position, steel pins 17 extend as far as possible into the annular groove 15 and have moved annular magnet 16 into its relatively uppermost position. In this position, annular magnet 16 has lifted the ball 7 off funnel 8 and has pulled ball 7 upwardly so that the latter rests against the inner wall of the widened chamber 6. In this way, the passage for thread 9 for carrying out the threading operation is free. Thread 9 can freely be pulled from above the thread guiding tube 4 all the way downwardly by means of said auxiliary device 19. The said auxiliary device 19 may be a pneumatic device which pulls the thread through. Since such pneumatic device does not form a part of the present invention, and is commonly known, no further description thereof appears to be necessary. This system may also be applied to other thread brakes.

Figure 3:
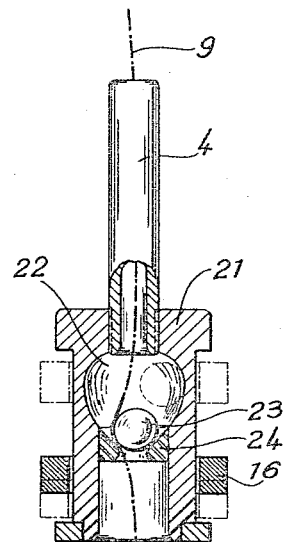
FIGURE 3 is a modified thread brake according to the present invention.

Referring now to the thread brake of FIG. 3, the principle thereof corresponds to that of FIG. 1. The brake body housing 21 is again provided with a broadened chamber 22 having freely movably mounted therein a ball 23. An annular magnet 16 surrounds the brake body housing 2, and when occupying its lower position shown in full lines, pulls ball 23 into thread passage funnel 24 so that thread 9 is again clamped or braked by ball 3. When annular magnet 16 is moved upwardly relative to housing 21, into its dot-dash position, ball 23 will be lifted off said funnel 24 and the passage for the thread is completely free.

Figure 4:
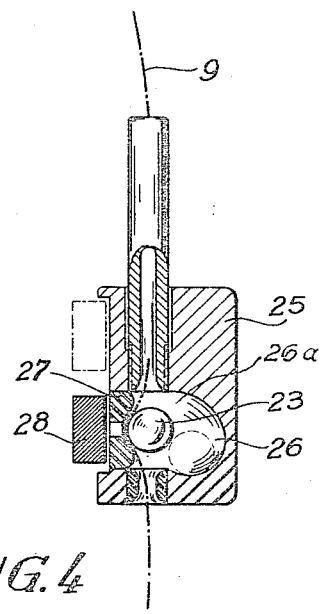
FIGURE 4 is a still further modification of a thread brake of the present invention.

According to the modification shown in FIG. 4, the brake body housing 25 is provided with a ball pocket 26 which is arranged unilaterally. That side of chamber 26a which is located opposite ball pocket 26 is closed by a trough-shaped brake body 27 behind which there is arranged a magnet 28 displaceable in the direction of movement of thread 9. Magnet 28 will, in the position shown in full lines in the drawing, hold ball 23 in the trough-shaped brake body 27. When, however, magnet 28 is moved upwardly, the magnet field will be weakened or interrupted so that ball 23 will drop off the trough-shaped brake body 27 and will move into ball pocket 26, as indicated by dot-dash lines. Thread 9 can now be freely passed through housing 25.

Figure 5:
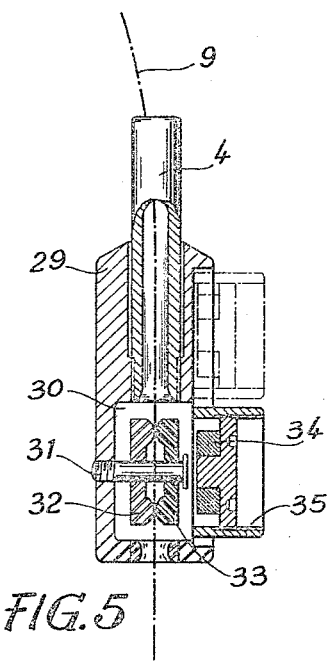
FIGURE 5 is still another modification of a thread brake according to the invention.

In conformity with the embodiment of FIG. 5, the thread guiding tube 4 is seated in the brake body housing 29 which has its lower portion provided with an enlarged chamber 30. A pin 31 extends in chamber 30 in a direction transverse to the driection of movement of thread 9. Pin 31 has connected thereto a non-magnetic braking disc 32. Axially displaceably mounted on pin 31 is furthermore a brake disc 33 of magnetic material while a magnet 34 is arranged behind brake disc 33. Magnet 34 is connected to a magnet holder 35. Magnet 34 is adjustable in magnet holder 35 in the direction of pin 31 in order to be able to control the magnetic force by changing the distance between magnet 34 and the brake disc of magnetic material. The magnet holder is displaceable on housing 29 in the direction of movement of the thread. Annular magnet 34 is of such character as to repel magnetic disc 33 of magnetic material so that brake disc 33 of magnetic material is in the illustrated position of magnet 34 pressed against the non-magnetic disc 32. As a result thereof, the thread 9 will be pressed between the two brake discs. When magnet 34 is moved into its upper dot-dash-line location, the magnetic field is interrupted or weakened to such an extent that brake disc 33 of magnetic material will automatically be detached from the non-magnetic brake disc 32 thereby permitting thread 9 freely and unimpedly to pass through.

Figure 6:
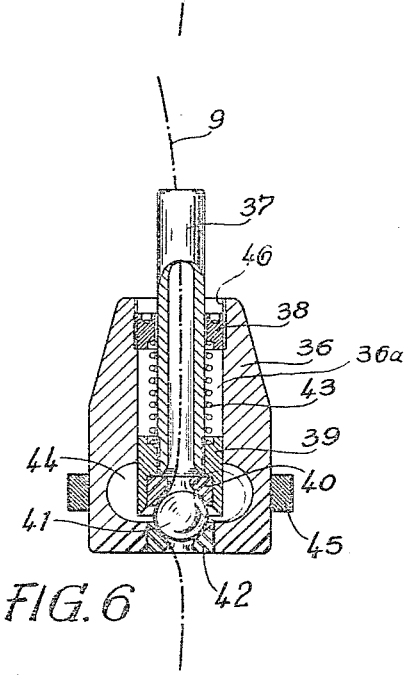
FIGURE 6 represents still another modification of a thread brake according to the invention, in which the braking force is furnished by a spring.

According to the embodiment of FIG. 6, thread-guiding tube 37 extends axially into brake body housing 36. Thread-guiding tube 37 is axially displaceable in a bushing 38 which is threaded into a threaded portion 46 of bore 36a in housing 36. The lower end of thread-guiding tube 37 has threadedly connected thereto a bushing 39 the lower portion of which forms a thread passage funnel 40 by means of which thread-guide pipe 37 rests on a ball 41 which in its turn rests on a passage funnel 42 at the lower end of housing 36. The required direct pressure from above is exerted by a spring 43 which is interposed between bearing sleeve or bushing 38 and sleeve or bushing 39. Within the range of a widened chamber 44 in housing 36, the latter is surrounded by an annular magnet 45. When threaded-guiding tube 37 is lifted against the thrust of spring 43, ball 41 will be freed. Consequently, it will be attracted by magnet 45 and pulled into the enlargement 44. This position is indicated by dot-dash lines. Thus, the passage for thread 9 is free. When thread-guiding tube 37 is released, it will, by spring 43 again move downwardly. Ball 41 is thus free to move out of enlargement 44 into a centric position so that ball 41 can again seat itself on the thread passage funnel 42. It will be appreciated that thread 9 is braked inasmuch as it is looped around ball 41 by approximately 180°. Moreover, thread 9 is subjected to friction on the ball surface and on the inner surface of the two thread passage funnels 40 and 42.

It is, of course, to be understood that the present invention is, by no means, limited to the particular constructions shown in the drawings, but also comprises any modifications within the scope of the appended claims. Thus, instead of providing a spring 43, the required braking force may also be adjustable by a weight or weights or by adjustable magnets, in which instance magnet 45 when being axially displaced makes possible a change in the magnetic force acting upon ball 41.

What I claim is:

1. In combination with a tubular member having an axial bore with a thread inlet and a thread outlet for conveying a thread therethrough, especially for double twist spindles: a thread brake having housing means defining a chamber provided with a chamber inlet communcating with said thread outlet and also provided with a chamber outlet for conveying a thread from said chamber inlet to and through said chamber outlet, first brake means associated with said housing means, second brake means arranged for cooperation with said first brake means and movable relative toward and away from said first brake means for respectively engaging and disengaging a thread therebetween which is conveyed into said chamber through said axial bore of said tubular member, and magnetic means axially movable selectively toward and away from one of said brake means to control the positions of said two brake means relative to each other.

2. In combination with a tubular member having an axial bore with a thread inlet and a thread outlet for conveying a thread therethrough, especially for double twist spindles: a thread brake having housing means defining a chamber provided with a chamber inlet communicating with said thread outlet and also provided with a chamber outlet for conveying a thread from said chamber inlet to and through said chamber outlet, a movable brake member freely movable in said chamber, and magnetic means associated with said housing and displaceable relative thereto in axial direction of said bore for selectively pulling said brake member against a wall portion of said housing means and lifting said brake member off said wall portion.

3. In combination with a tubular member having an axial bore with a thread inlet and a thread outlet for conveying a thread therethrough, especially for double twist spindles: a thread brake having a first brake member and a second brake member movable relative to said first brake member and operable to engage therebetween a thread conveyed through said axial bore between said two brake members, and magnetic means reciprocable in the direction of the path of a thread through said axial bore and between said two brake members and operable selectively to magnetically direct said movable brake member toward and away from said first brake member.

4. In combination with a tubular member having an axial bore with a thread inlet and a thread outlet for conveying a thread therethrough, especially for double twist spindles: a thread brake having housing means defining a chamber provided with a chamber inlet communicating with said thread outlet and also provided with a chamber outlet having an outwardly tapering section for conveying a thread from said chamber inlet to and through said chamber outlet, a magnetically reactive ball displaceably located in said chamber and movable into and out of said tapering section, and annular magnetic means surrounding said housing means and adjustable along the same and having a magnetic range sufficient to selectively move said ball into and out of said tapered section in conformity with the respective adjusted position of said magnetic means.

5. An arrangement according to claim 4, in which said chamber includes an area having a transverse extension equalling at least twice the diameter of said ball.

6. In combination with a tubular member having an axial bore with a tubular member having an axial bore with a thread inlet and a thread outlet for conveying a thread therethrough, especially for double twist spindles: a thread brake having a housing connected to said tubular member and defining a chamber provided with a chamber inlet communicating with said thread outlet and also provided with a chamber outlet having an outwardly tapering section for conveying a thread from said chamber inlet to and through said chamber outlet, a magnetically reactive ball arranged in said chamber and movable into and out of said tapering section, said chamber including a cross-sectional area of a diameter considerably greater than the diameter of said ball, spring means arranged below said housing means and yieldably supporting the same, supporting means supporting said spring means, guiding means axially guiding said housing means, said housing means having annular recess means therein extending around said chamber, annular magnetic means arranged in said recess means and axially displaceable therein, and sleeve means supported by said supporting means and adapted in response to a movement of said housing relative to said sleeve means to enter said recess means to thereby displace said annular magnetic means and causing the same through its magnetic force to move said ball out of said tapering section into said cross-sectional area.

7. In combination with a tubular member having an axial bore with a thread inlet and a thread outlet for conveying a thread therethrough, especially for double twist spindles: a thread brake having housing means defining a chamber provided wtih a chamber inlet communicating with said thread outlet and also provided with a chamber outlet for conveying a thread from said chamber inlet to and through said chamber outlet, said chamber having a unilateral extension forming a pocket and having a trough-shaped area arranged opposite said pocket, a steel ball movably arranged in said chamber and movable from said pocket to said trough-shaped area, and magnetic means movable relative to said housing means from a first position within magnetic range of said ball in any position thereof in said chamber to a second position out of said magnetic range and vice versa.

8. In combination with a tubular member having an axial bore with a thread inlet and a thread outlet for conveying a thread therethrough, especially for double twist spindles: a thread brake having housing means defining a chamber provided with a chamber inlet communicating with said thread outlet and also provided with a chamber outlet for conveying a thread from said chamber inlet to and through said chamber outlet, pin means supported by said housing and extending into said chamber in a direction transverse to the path of a thread conveyed through said chamber from said chamber inlet to said chamber outlet, non-magnetic disc means supported by said pin means, magnetic disc means likewise supported by said pin means and movable relative thereto for selectively engaging therebetween a thread to be passed through said chamber, and magnetic means movable in the direction transverse to the axial direction of said pin means into a first position within magnetic range of said magnetic disc means to a second position out of said range and vice versa.

9. An arrangement according to claim 8, in which said magnetic means is adjustable in the axial direction of said pin means.

10. In combination with a tubular member having an axial bore with a thread inlet and a thread outlet for conveying a thread therethrough, especially for double twist spindles: a thread brake having housing means defining a chamber adapted to receive a thread passed through said tubular member, said chamber being provided with a chamber outlet for conveying a thread received in said chamber from the latter to and through said chamber outlet, said tubular member being axially displaceable in said housing means and having flaring means movable into said chamber into substantially axial alignment with said chamber outlet, spring means continuously urging said flaring means into said chamber, a magnetically reactive ball movably arranged in said chamber and movable into and out of said chamber outlet, said chamber having an intermediate cross-sectional portion having a diameter considerably greater than the diameter of said ball, and magnetic ring means extending around said housing and movable thereon in axial direction of said tubular means from a first position within magnetic range of said ball to a second position out of said magnetic range and vice versa.

References Cited by the Examiner

UNITED STATES PATENTS

| 2,281,204 | 4/1942 | Raymond | 57—58.86 X |
| 2,667,029 | 1/1954 | Uhlig | 57—58.86 |
| 2,827,756 | 3/1958 | Kellogg et al. | 57—58.86 |

FOREIGN PATENTS

| 1,246,080 | 10/1960 | France. |
| 677,547 | 8/1952 | Great Britain. |
| 725,283 | 3/1955 | Great Britain. |
| 785,770 | 11/1957 | Great Britain. |

FRANK J. COHEN, *Primary Examiner.*

D. E. WATKINS, *Examiner.*